United States Patent [11] 3,632,059

[72] Inventor Winfield Warren Loose
Linglestown, Pa.
[21] Appl. No. 167,061
[22] Filed Aug. 17, 1971
[45] Patented Jan. 4, 1972
[73] Assignee AMP Incorporated
Harrisburg, Pa.

[54] RETRACTOR SEAT BELT REEL HAVING ELECTRICAL SWITCH FOR AUTOMOTIVE SAFETY CIRCUIT
8 Claims, 12 Drawing Figs.
[52] U.S. Cl. .................................................. 242/107.4,
200/61.58 SB, 280/150 SB
[51] Int. Cl. ...................................................... A62b 35/00
[50] Field of Search ........................................... 242/107
SB, 107.1, 107.11, 107.2, 107.4, 107.5; 297/388;
280/150 SB; 200/61.58 SB, 61.59, 61.67, 61.68

[56] References Cited
UNITED STATES PATENTS
| | | | |
|---|---|---|---|
| 3,375,495 | 3/1968 | Burns .......................... | 280/150 SB |
| 3,381,268 | 4/1968 | Boblitz ........................ | 280/150 SB |
| 3,412,952 | 11/1968 | Wohlert et al. .............. | 242/107.4 |
| 3,519,771 | 7/1970 | Burns .......................... | 200/61.58 B |
| 3,558,075 | 1/1971 | Stoffel ......................... | 242/107.4 |

*Primary Examiner*—Stanley N. Gilreath
*Assistant Examiner*—Werner H. Schroeder
*Attorney*—William J. Keating, et al.

ABSTRACT: Combination of retraction seat belt reel assembly and electrical switch mounted on the frame of the reel assembly. The reel assembly is of the type which has deferred action locking means for preventing withdrawal of additional seat belting from the reel after the withdrawal of a predetermined amount of belting. The deferred action locking means controls the condition of the switch in a manner such that the condition is changed after actuation of the locking means. The switch is used to control a safety circuit for the car.

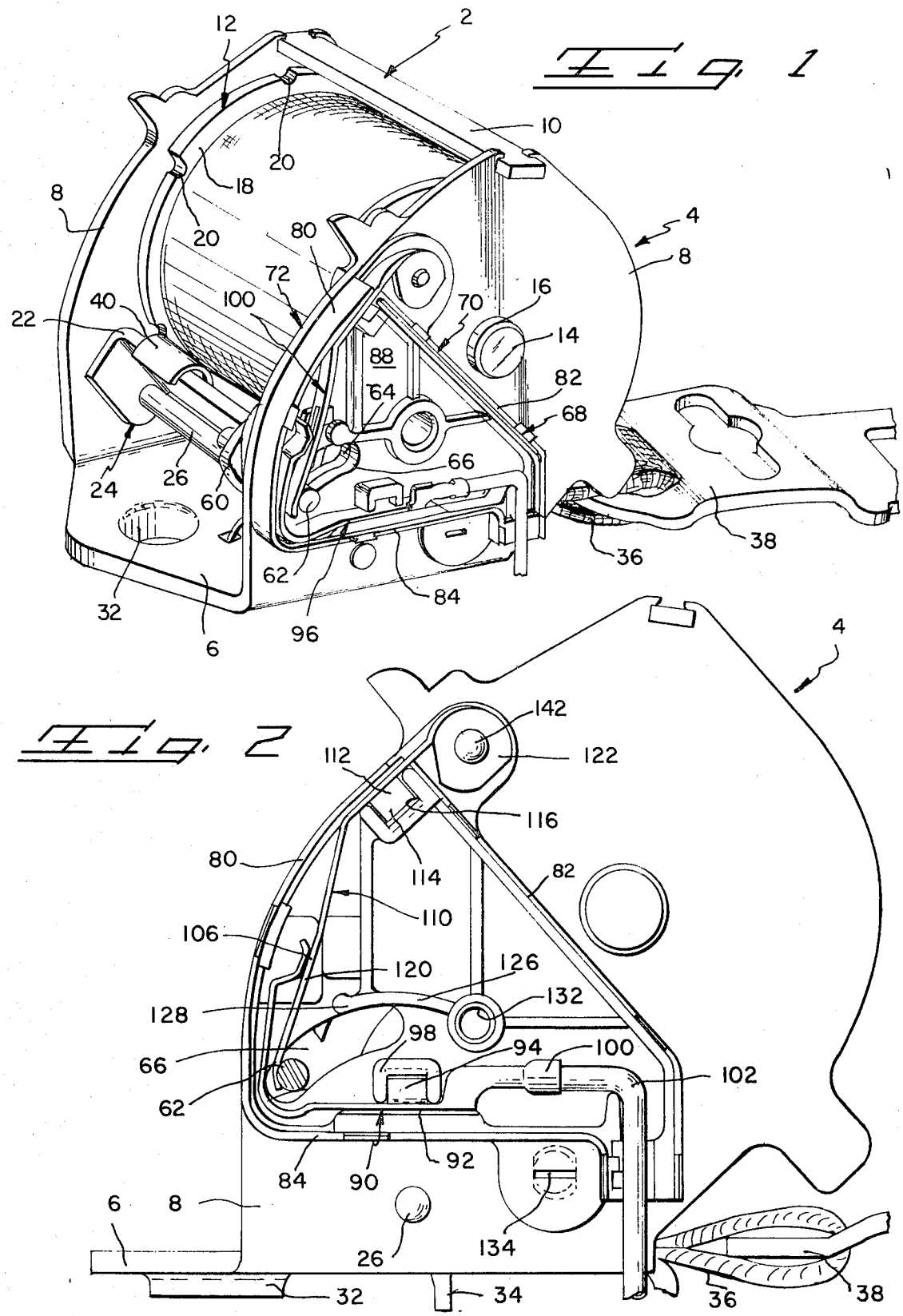

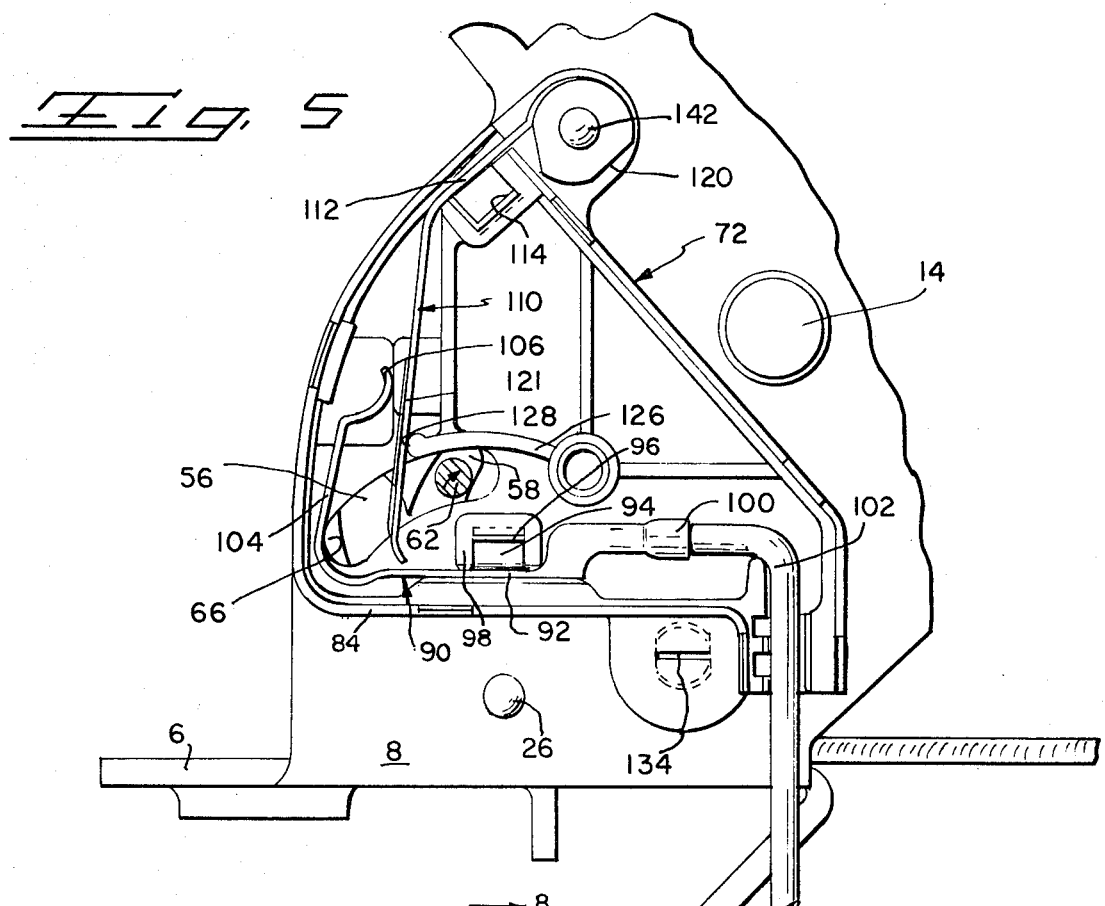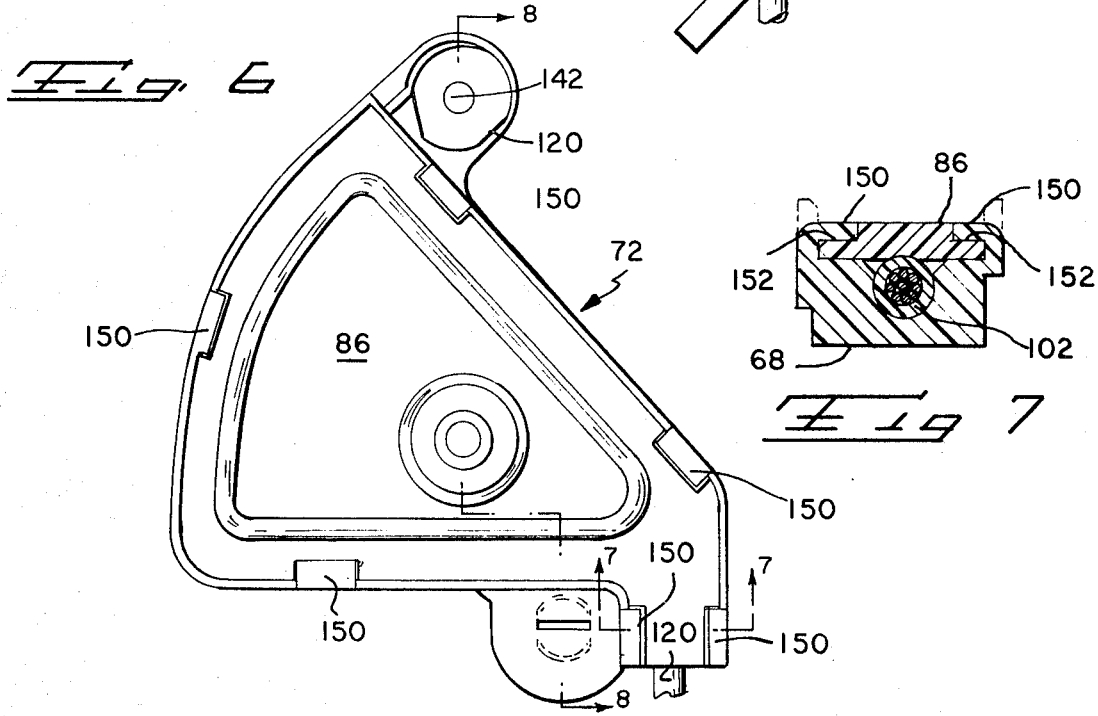

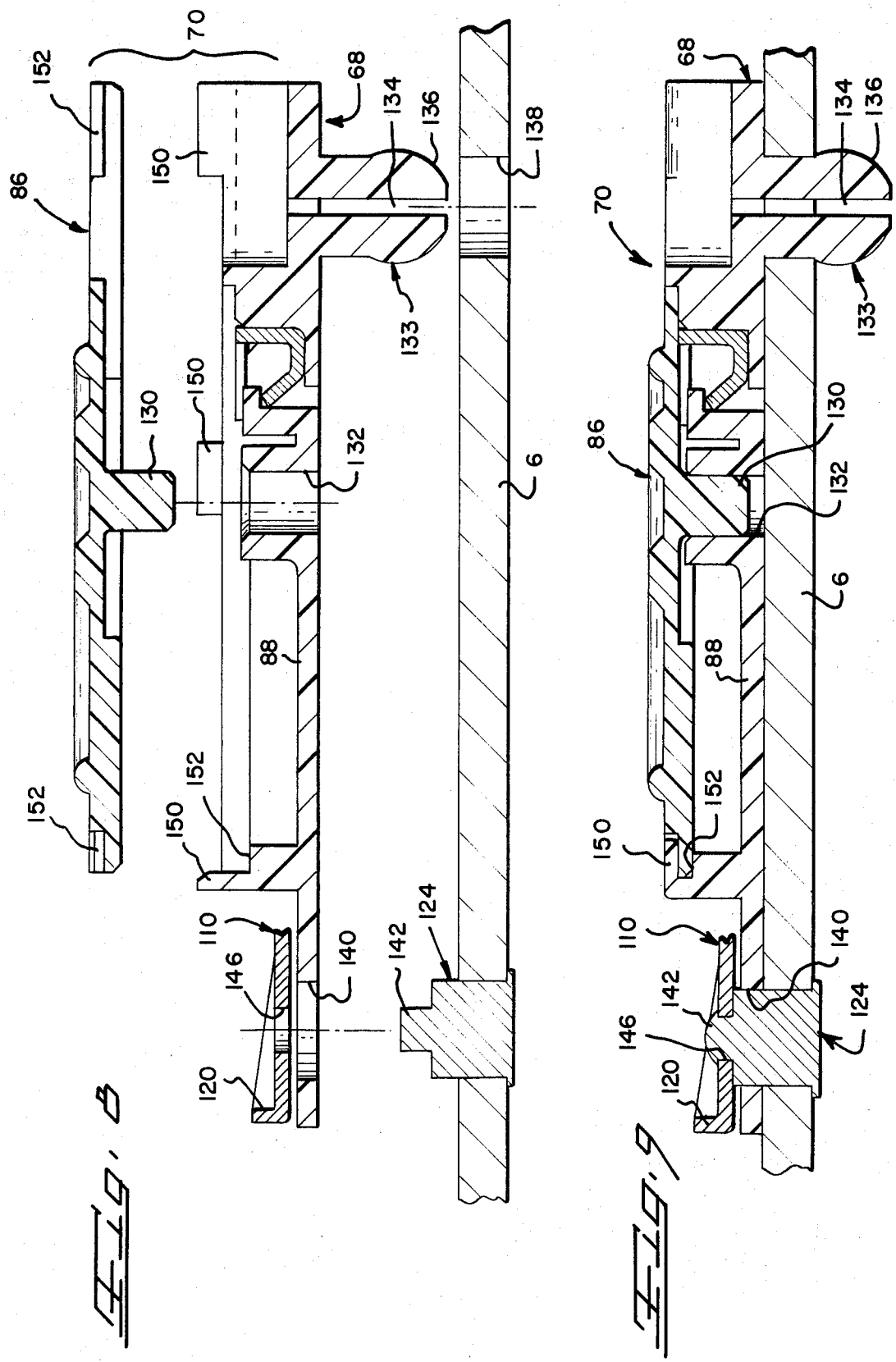

RETRACTOR SEAT BELT REEL HAVING ELECTRICAL SWITCH FOR AUTOMOTIVE SAFETY CIRCUIT

BACKGROUND OF THE INVENTION

1. Field of the Invention

This invention relates to seat belt alarm systems for passenger motor vehicles and more particularly to a seat belt reel assembly having a switch operable only in response to a predetermined retraction condition of a seat belt reel assembly.

2. Description of the Prior Art

Seat belts are generally used both for the driver and the passengers in the automotive vehicle field. In general, the seat belt section nearest the door is fixed to the vehicle at the base of the seat and to one side thereof by means of a retraction seat belt reel assembly whereby, during nonuse, this particular section of the seat belt retracts on the reel or drum under a spring bias to await subsequent use by the driver or the passenger. In one form of retractable seat belt reel assembly, a spring-biased pawl and ratchet mechanism forms a portion of the assembly which permits ready unreeling of a short length of the belt from its fully retracted position and retraction of the same in multiple cycle fashion. However, during normal use and after unreeling of a predetermined length of belt section, upon relaxation of the tension which normally occurs after coupling of two belt sections together, it is impossible to further extend unreeled belt an additional length without first permitting full retraction. Locking of the pawl and ratchet mechanism obviously prevents the belt from releasing the occupant during an emergency stop or as a result of impact with a vehicle or other object.

In an attempt to insure that the vehicle occupants including the driver actually use the seat belts or shoulder harness, various seat belt alarm systems have been designed which produce signals responsive to failure to complete fastening of the seat belt which either alert the driver of the vehicle as well as any of the passengers in such event or when coupled to the starter circuit or the ignition system or like circuit, automatically render the vehicle inoperative. Such seat belt alarm systems have in the past included switches associated with the retraction seat belt reel assembly for indicating the state or condition of the seat belt section wrapped about the reel of the same. One prior art retraction seat belt assembly including a switch mechanism operable in response to a change in state insofar as the retractable seat belt is concerned, involves an arcuate slot on a radius with respect to the drum or reel axle, formed within an end wall of the reel assembly housing, with a transversely extending cross head abutment in contact with the outermost convolution of the wrapped belt section. The cross heat abutment is spring biased towards the drum or reel periphery and a switch is fixedly mounted such that upon depletion of the reel of the belt convolution the cross head contacts the switch actuator to change the state of the switch and indicate extension or unreeling of the seat belt section and ostensibly indicate that completion of the seat belt fastening has occurred either turning off the alarm or allowing vehicle ignition to proceed.

Switches of this type are at best inaccurate in that they totally depend upon the number of convolutions or wraps of the belt about the reel or drum and are insensitive to whether or not the seat belt is actually fastened.

SUMMARY OF THE INVENTION

The present invention is directed to an improved seat belt switch for a retraction seat belt reel assembly which insures change of state of the switch only upon completion in fastening of the two seat belt sections together and senses the relaxation in tension due to coupling rather than the mere extension or unwinding of a predetermined length of a given seat belt section carried by the retraction reel assembly. Further, the switch is positively actuated in response to operation or change in state of a pawl and ratchet mechanism which prevents further removal of the seat belt section from the reel after a slight relaxation in tension indicative of proper coupling of the seat belt section and thus forms a positive indication element of a seat belt alarm system.

The invention is directed to an improvement in the retraction seat belt reel assembly for a vehicle which includes a housing anchored to the vehicle body and carrying a spring return reel rotatably supported therein and about which the seat belt section is wound. A spring-biased ratchet mechanism prevents further withdrawal of the seat belt section upon removal of a predetermined length of belt and upon release of tension. The invention is directed to the improvement which comprises a switch operatively associated with the pawl and ratchet mechanism and responsive to change in state of the pawl and ratchet mechanism from inoperative to operative to change its own state in synchronism therewith.

In particular, the improvement is directed to a retraction reel assembly wherein the reel includes at least one end flange whose periphery carries ratchet teeth and a pawl is mounted beside of the reel for pivoting about an axis parallel to the reel axis with spring means biasing the pawl into engagement with the teeth upon spring retraction of the reel. The reel further carries a locking arm pivotable about the reel axis which is provided with a V-shaped locking slot at the outer end of the same, including a locking slot section and an unlocking slot section. The pawl includes a pin extending parallel to the pawl pivot axis with a portion received within the slot and always movable into the unlocking section of the V-shaped slot during repeated unwinding and retraction of the belt section less than a predetermined length and movable sequentially first into said unlocking slot section and then into said locking section after unwinding of a belt section of said predetermined length to prevent further belt unwinding. The switch comprises at least one contact movable in response to switching of the pin from the one slot section to the other for changing the state of the switch.

The end wall of the reel assembly housing preferably includes an arcuate slot with the pin extending from the pawl projecting through the same and the switch includes a first spring contact arm overlying the pin to the side opposite the reel axis and a second contact arm to the same side of the pin and overlapping the first contact arm and biased in the same direction as that of the pawl carrying the pin. The pin is so located on the pawl that the unlocking section of the V-shaped slot is more remote from the reel axis than the locking section and the second spring contact arm follows the pin from the unlocking slot section to the locking slot section and out of contact with the first spring contact arm to open the switch contacts. The switch further includes a molded body of insulation material, with the base wall lying flush with the outer surface of the reel assembly housing end wall. An arcuate slot within the switch body base wall corresponds to that of the housing end wall. Sidewalls extend around the base wall and the first contact has a web portion fixed to the sidewall underlying the slot. Wire barrel crimp means extend to the side of the web remote from the slot and a first flexible contact arm, integral with the web portion, is bent generally at right angles to the web portion about the outboard end of said molded body slot. A second flexible contact arm has a web portion lying adjacent another sidewall and is provided with a web portion fixedly coupled to the body. The free end of said second flexible contact arm extends across the slot and inboard of the first arm with the end terminating beyond the end of the first flexible contact arm to contact the face of the pin remote from the axis of the reel. The end of the second contact arm, remote from the slot, is grounded to the metal reel assembly housing. A cover is coupled to said base with its edges overlying the sidewalls to close off the switch contacts except for the arcuate slot. A rib extends inwardly along one edge of the slot within the molded insulation body and has a contact edge lying in the path of the second contact arm to limit movement of the second contact away from the first during opening of the switch contacts. The end wall of the reel assembly housing is apertured and an integral projection extending outwardly of the molded switch body base snaps into the same to maintain the switch body in proper position with respect to the reel assembly housing.

BRIEF DESCRIPTION OF THE DRAWINGS

FIG. 1 is a perspective view of one embodiment of the improved retraction seat belt reel assembly incorporating in one form the retraction seat belt switch of the present invention with the cover removed.

FIG. 2 is a side elevational view of the assembly of FIG. 1 with the pawl and ratchet mechanism in the unlocked state prior to unwinding of the seat belt and with the switch contacts closed.

FIG. 5 is a similar elevational view of the assembly to that of FIGS. 2 and 3 with the pawl and ratchet mechanism in locking position and with the switch contacts open.

FIG. 6 is an elevational view of the assembly similar to that of FIG. 5 with the cover in place.

FIG. 7 is a sectional view of a portion of the switch of FIG. 5 taken about line 7—7 of FIG. 5.

FIG. 8 is an exploded, sectional view of the switch illustrated in FIG. 5 taken about line 8—8 of FIG. 5.

FIG. 9 is a sectional view of the same similar to that of FIG. 8 with components in assembled position.

DESCRIPTION OF THE PREFERRED EMBODIMENT

Figure 3:
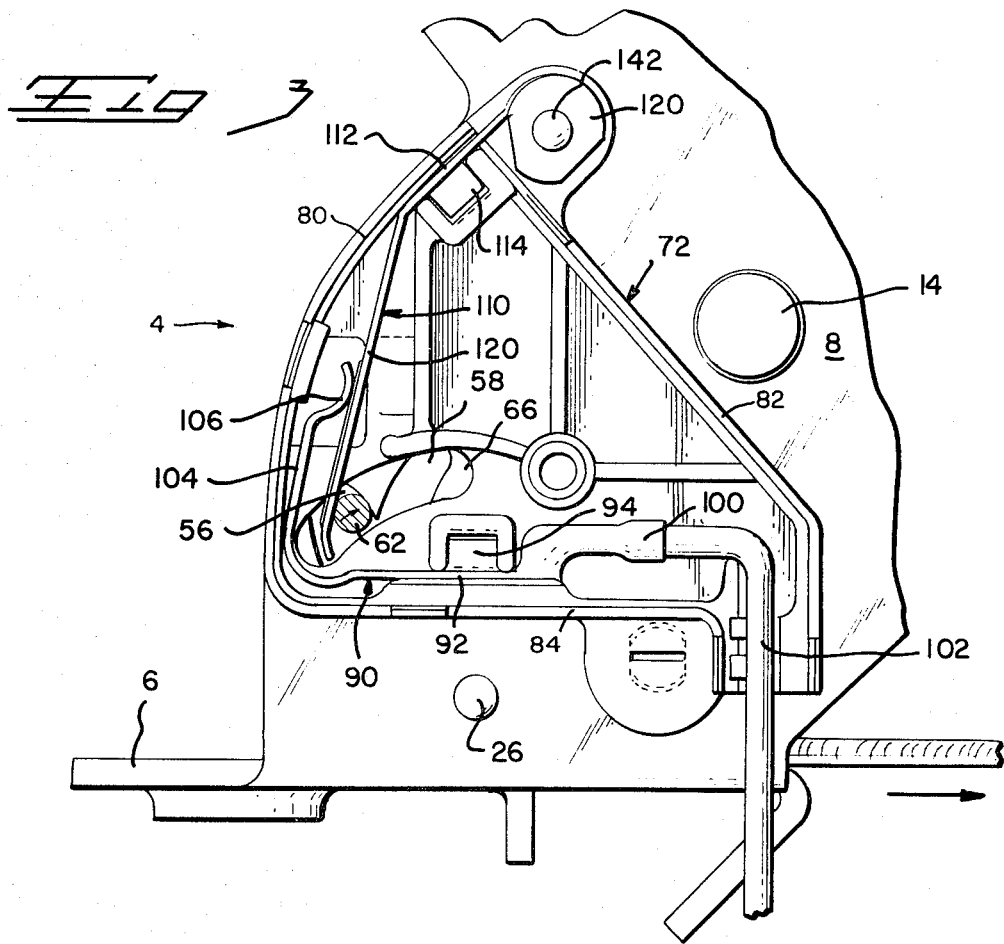
FIG. 3 is a similar elevational view to that of the assembly of FIG. 2 after removal of a limited length of belt material therefrom with the pawl and ratchet mechanism retained in the unlocked position and with the switch contacts closed.
Figure 4:
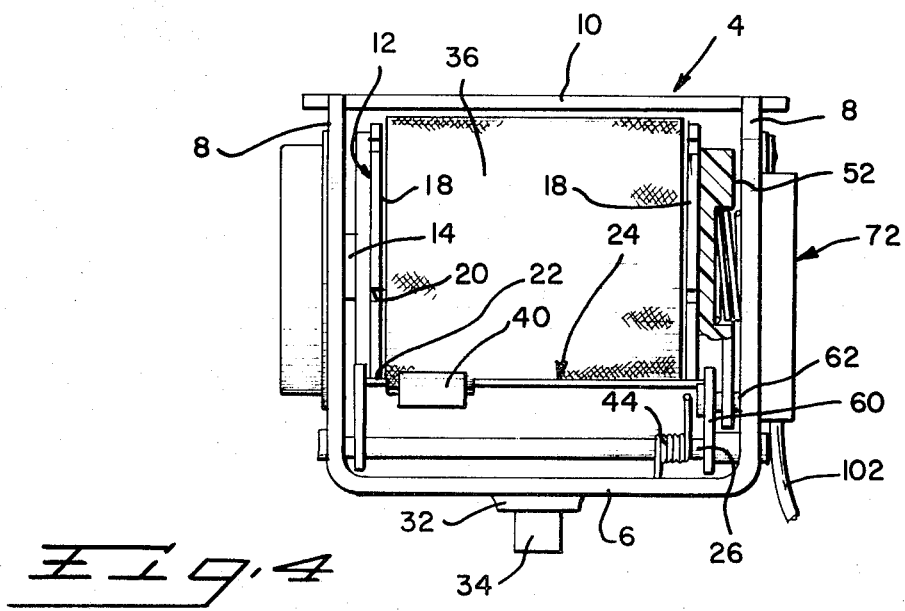
FIG. 4 is a front elevational view partially in section of the assembly shown in FIG. 3, as seen from the direction of arrow 4 in FIG. 3.

Referring to the drawings, FIG. 1 illustrates a retraction seat belt reel assembly 2 consisting of a generally U-shaped retraction reel assembly housing 4 including a base 6, a pair of opposed frame plates or end walls 8 extending upwardly from the base and being generally parallel to each other and joined at the top by a coupling bar 10. Within the interior of the housing there is rotatably positioned a retractor spool or reel 12 mounted for rotation on a reel support shaft 14 which extends through opposed openings 16 within respective frame plates 8 of the housing. End flanges 18 have ratchet teeth 20 on the periphery of the same, the ratchet teeth contact edge 22 of a pivotable, U-shaped pawl 24 which is mounted for rotation about a horizontal axis defined by the pawl pivot shaft 26 which is also received within openings of the housing end walls 8 near base 6. The base 6 itself includes means such as a flanged opening 32 and depending tab 34 allowing the housing to be rigidly fixed to the passenger vehicle (not shown) to which the switch of the present invention has application.

Figure 10:
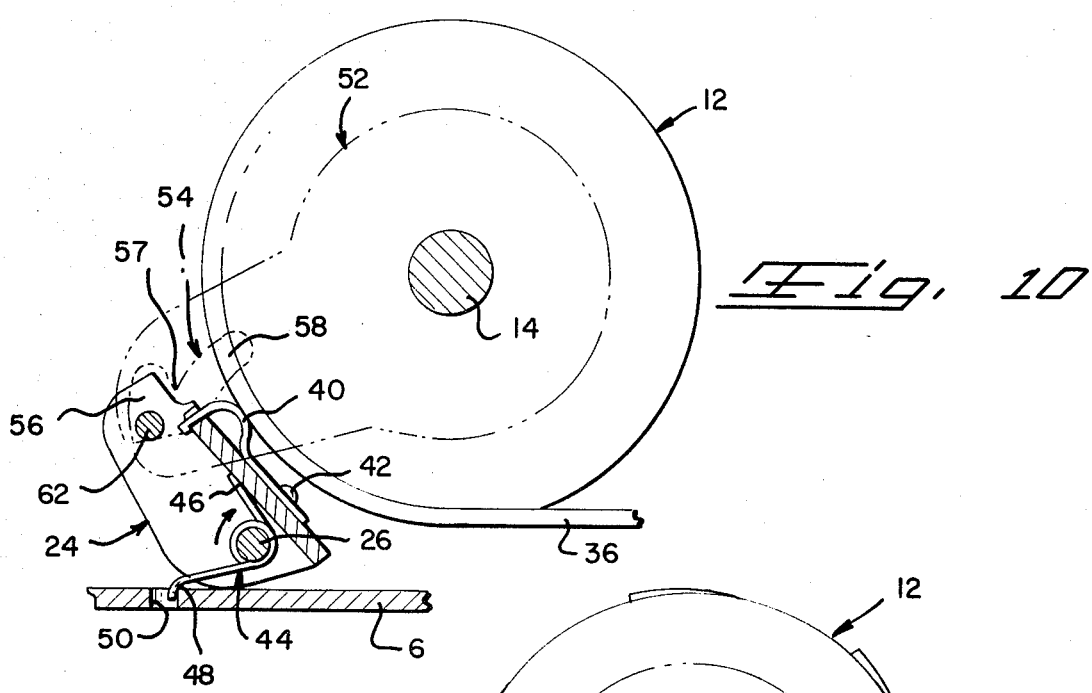
FIG. 10 is a sectional, schematic view of the pawl and ratchet mechanism of the retraction seat belt assembly of FIG. 1 to which the switch of the present invention has application, with the belt fully retracted, with the pawl and ratchet mechanism in unlocked position.
Figure 11:
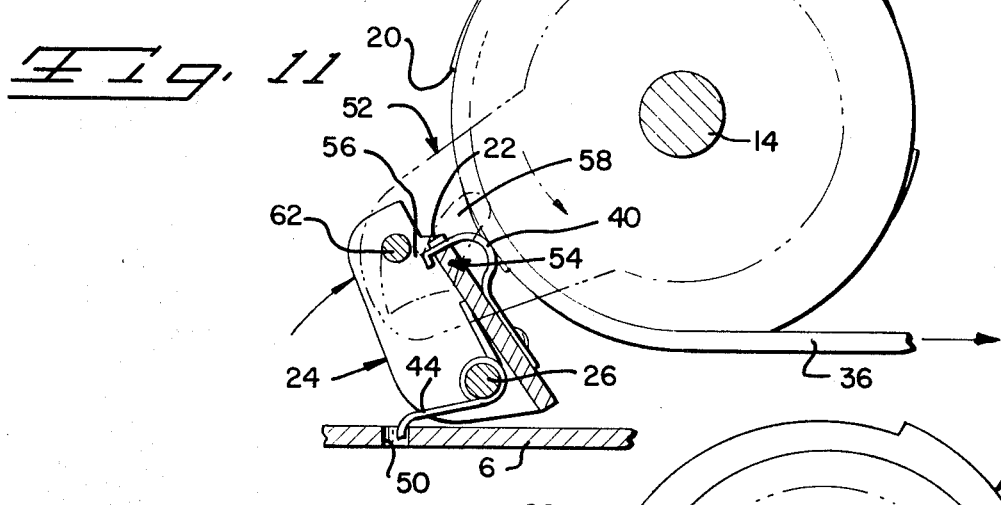
FIG. 11 is a similar schematic elevational view to that of FIG. 10 after unwinding of a limited length of belt with the pawl and ratchet mechanism unlocked.
Figure 12:
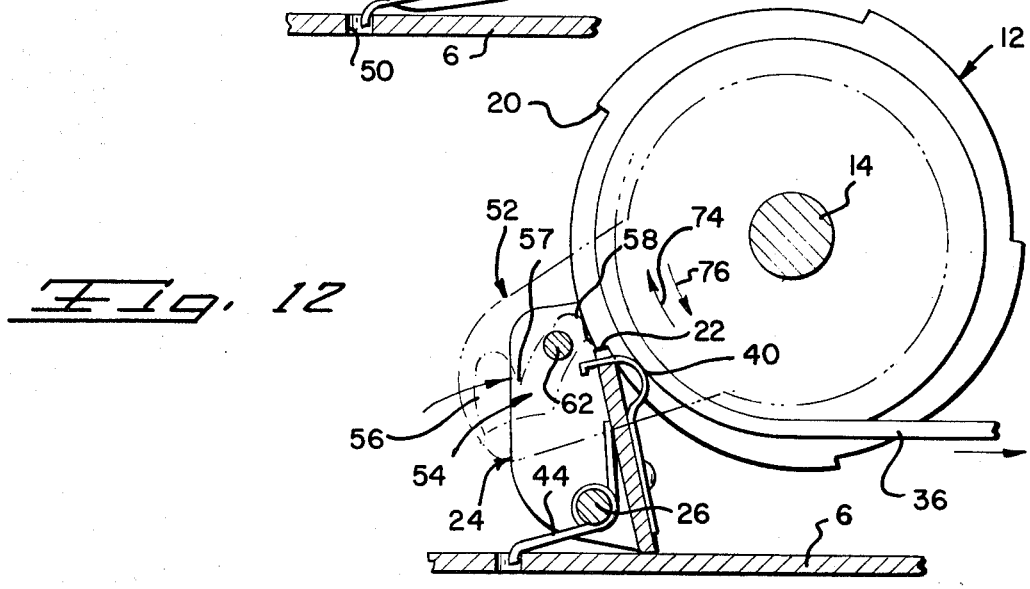
FIG. 12 is a similar schematic, elevational view to that of FIGS. 10 and 11 after unwinding of a predetermined length of belt and with the pawl and ratchet mechanism in locked position to prevent further unwinding of the belt.

The manner of operation of the pawl and ratchet mechanism may be best seen by reference to the schematic elevational views of FIGS. 10, 11 and 12, taken in conjunction with FIG. 1. A seat belt section 36 has its free end linked to a belt buckle or coupling member 38 while the opposite end is wound about the retractor spool or reel 12. On the forward face of the pivotable pawl 24 is a spring abutment 40 which is coupled to the same at its lower end by a rivet 42 with the curved portion riding on the face of the outermost convolution of belt 36 as seen best in FIG. 10. A biasing spring 44 is wrapped about the pawl pivot shaft 26 with one end 46 abutting the rear side of pawl 24 and the other end 48 received within an opening 50 within base 6 of the reel assembly housing 4. Thus, the pawl 24 is constantly biasing clockwise in FIGS. 10, 11 and 12, forcing the abutment 40 against the outermost convolution of belt 36, as seen by the arrow in FIG. 10.

Also, forming an important aspect of the pawl and ratchet mechanism is a pivotable locking member in the form of a locking arm 52 which is pivotably mounted for free rotation about reel support shaft 14, arm 52 being provided with an irregular V-shaped slot 54 constituting an outermost or unlocking section 56 and an innermost locking section 58. Locking arm 52 is positioned adjacent the drum to the outside of a right-hand reel flange 18, and between the reel 12 and the right-hand end wall 8. Further extending outwardly from the right-hand sidewall 60 of the pivotable pawl 24 is a combined switch actuating pin and ratchet locking member 62 which passes outwardly through a pair of aligned arcuate slots including slot 64 formed within the right-hand frame plate, FIG. 1, of the reel assembly housing 4 and an arcuate housing slot 66 formed within base wall 68 of a molded plastic switch body 70 of the retraction seat switch 72 of the present invention. Importantly, the switch actuator pin and locking member 62 is received within the V-shaped slot 54 of the locking arm 52 and as such permits locking of the reel that prevents further withdrawal of the belt after the belt has been initially withdrawn to a predetermined length and tension is relaxed slightly as normally occurs during coupling of the buckles such as buckle 38 to complete fastening of the belt. By virtue of the fact that the pin 62 extends through the slot 54, rotation of the locking arm on the shaft 14 is limited. It will also be apparent from the foregoing description and from the description of operation presented below that the slot 54 constitutes a means to control the position of the pin 62 and, therefore, the position of the pawl 24.

Briefly, this operation, which is a necessary element to the operation of the switch 72, occurs as follows. By reference to FIG. 10, belt 36 is shown in its fully retracted position with abutment 40 riding on the outside of the outermost convolution of the belt 36 and biased clockwise by spring 44. The locking pin 62 is retained within the outermost or unlocking slot section 56. In FIG. 10, no tension is being applied to the belt, although it is fully retracted. Upon initial withdrawal of the belt as illustrated by the counterclockwise arrow in FIG. 11, the pin 62 rides from the bottom of slot section 56 to the top of the same, and the pivotable pawl even though biased by the spring 44 is prevented from rotating to any greater extent than that illustrated in FIG. 11, and in fact, continued pulling removal of the belt and withdrawal of a predetermined length of belt will only result in the belt moving away from the curved surface of abutment 40 since in effect, at this time, the pin 62 cannot ride over tip 57 which separates groove or slot sections 56 and 58. Turning next to FIG. 12, after withdrawal of a predetermined length of belt 36 and assuming a slight retraction or release in tension of the belt, the belt tends to wind itself clockwise as indicated by arrow 74 of FIG. 12. Arm 52 rotates in the same direction, and this causes pin 62 to move down to the bottom of slot 56 and, during further extension or unwinding of belt 36, immediately moves over point 57 and into the innermost or locking slot section 58. This reversal in direction of the belt 36 that is an attempt to remove an additional portion in the direction of arrow 76 results in a slight counterclockwise rotation of the reel and arm 52, causing the pin to in effect move upward within locking slot 58 and at the same time permit edge 22 of the pawl to contact one of the teeth 20. In FIG. 12 the pawl and ratchet mechanism is now in the locked state. Note that the presence of the curved portion of the abutment 40 prevents the pawl and ratchet mechanism from engagement until there is a predetermined length of belt unwound from the reel. Upon further release of the belt 36 and movement of the belt to near fully wound or retracted position, the pawl and ratchet mechanism returns to the position shown in FIG. 10 and locking pin 62 moves out of locking slot section 58 and into unlocking slot section 56.

With this in mind, the switch mechanism of the present invention may be readily appreciated. The switch of the present invention constitutes a ready attachment to the spring-actuated seat belt retraction reel assembly and in fact requires the pawl and ratchet locking mechanism to act as the switch actuator to change the state or condition of the switch contacts in synchronism with the change in state of the pawl and ratchet mechanism. The molded plastic switch body 70 consists of a base 68 and a cover 86. The base 68 is generally triangular in plan configuration and includes short sidewalls 80, 82 and 84 integral with base wall 88 to define a relatively shallow cavity. A snap fit cover 86 completes the switch body. As mentioned previously, the base wall 88 is provided with an arcuate slot 66 which conforms exactly to the arcuate slot 64 within end wall 8 of the reel assembly housing, and it is through this pair of slots that the combined pawl and ratchet lock and switch actuator pin 62 extends, terminating short of cover 86.

A pair of normally closed contacts 90 and 110 complete the switch. A first contact 90 is provided with a central web portion 92 including a U-shaped mounting section 94 which is snapped into position within preformed rectangular recess 96 defined by a U-shaped projection or rib 98 of switch body base wall 88. The end of the contact 90 most remote from the arcuate slot 66 is provided with a wire barrel crimp portion 100 to which an insulated wire 102 is crimped in conventional fashion. A flexible contact arm 104 is bent at generally right angles at an apex of the housing and is curved about the outboard end of slot 66 with the contact end 106 of the arm offset slightly; that is, it is bent inwardly toward the pivot axis of the reel to define one switch contact surface area. The web portion 92 of the first contact is thus caught between a raised surface area and a thickened central portion of sidewall 84 so that contact 90 is maintained in position and prevented from vibrating loose.

This method of mounting likewise applies to the second contact 110 which includes a web portion 112 identically configured to that of the first contact and including an enlarged rectangular portion 114 received within a rectangular recess 116 defined by a U-shaped protrusion or rib 118, integral with base wall 88 and spaced slightly from the sidewall 80 of the switch body. A relatively straight flexible contact arm 120 extends in the opposite direction to contact arm 104 and overlaps the contact area 106 of the same to abut the actuator pin 62 and is self-biased toward the inboard end of slot 66. The second contact 110 terminates at its opposite end in an integral enlarged disc portion 122 which is coupled by means of metallic ground pin 124, FIG. 9, to the metal end wall 8 of the reel housing and is thus grounded, the pin 124 extending through the insulator switch housing wall 68. Preferably, an arcuate raised wall or rib 126 follows a portion of the arcuate slot 66 and has an abutment end 128 which acts to prevent further inward deflection of the second contact arm 120 as pin 62 moves towards the inboard end of slot 66. At this point, the contacts are open, as best seen in FIG. 5.

The method of assembly of the switch components and the coupling of the switch body itself to the metal reel housing may be best seen by reference to FIGS. 8 and 9. The outer, similarly configured cover 86 is provided with an integral mounting pin 130 which is received within hole 132 of switch body base 68, the cover being pivotable if necessary to allow access during assembly to the contact area or other portions interior of the switch housing. The switch body base 68 is provided with an integral projection 133 which is slotted at 134 and whose head is rounded at 136 to present an initial diameter in the relaxed condition which is slightly in excess of hole 138 within reel housing sidewall 8 which receives the same. However, after insertion as seen in FIG. 9, further relaxation of the headed end 136 of projection 133 permits the switch to be retained readily in place. Grounding of the switch contact 110 is seen by further reference to FIGS. 8 and 9 in which the ground pin 124 projects through opening 140 within the switch body base 68. The tip 142 of pin 124 is of smaller diameter but of a size permitting passage through hole or opening 146 within disc portion 120 of terminal 110. The tip 142 is then peened over as seen in FIG. 9 securing disc portion 122 of the contact to the reduced diameter portion of the ground pin and insuring proper electrical contact between the switch contact and the reel housing.

For purposes of locking the cover 86 to the switch body base 88, a switch body base 88 includes tabs 150 which may be plastically deformed once the cover is in place and the tabs 150 are deformed, filling recesses 152 within the cover.

The operation of the switch itself in cooperation with the pawl and ratchet locking mechanism for the retractable seat belt assembly may be best seen by sequential viewing of FIGS. 2, 3 and 5. In FIG. 2, the pawl and ratchet lock and switch actuator pin 62 is shown near the outboard end of slot 66 in which case contacts 90 and 110 are closed with flexible contact arm 120 being self-biased against pin 62, and as indicated, belt section 36 is in the fully retracted position. This position corresponds to the schematic view of FIG. 10 with the belt fully retracted. In turn, FIG. 3 illustrates the position of the switch contacts and actuating pin corresponding in general to that of the schematic view of FIG. 11 in which the belt is unwound slightly and in which case, the pawl and ratchet lock and switch actuator pin 62 is maintained in slot section 56. Note in FIG. 3 that switch contacts 90 and 110 remain closed, although the pin 62 has shifted slightly toward the inboard end of arcuate slot 66 within the switch body base 68.

Further reference to FIG. 5 illustrates a condition similar to that shown schematically in FIG. 12 in which a predetermined length of belt section 36 has been unwound from the reel and a slight relaxation in tension of the belt section causes locking arm 52 to rotate counterclockwise as a result of coupling or fastening of the belt. The pawl and ratchet mechanism under the spring bias of coil spring 44 has rotated clockwise about the pivot axis of pivot pin 26 to move into tooth-engaging position and at the same time the locking and switch actuator pin 62 has moved from the unlocking slot section 56 to the locking slot section 58 and therefore, toward the inboard end of arcuate slot 66. At this point, the flexible contact arm 120 of contact 110 moves into abutment with the end 128 or rib 126 preventing the contact arm from continuing to follow pin 62. However, the self-biased movement of contact arm 120 is sufficient to move it away from contact surface area 106 of the flexible contact arm 104 and the switch has thus changed state in synchronism with the change in state of the pawl and ratchet locking mechanism. Further unwinding or extraction of the belt section 36 is prevented prior to full retraction of the belt section, since a predetermined length of belt section has been unwound and a slight retraction or relaxation in tension has occurred to change the states of both the indicator switch and the pawl and ratchet locking mechanism. Full retraction of the belt results in the return of the belt and the pawl and ratchet mechanism to the position shown in FIG. 10 and the switch contacts to the position shown in FIGS. 1 and 2.

Thus, it is seen that the switch mechanism of the present invention is ideally suitable for easy and positive coupling to the retractable seat belt reel assembly and is fully responsive to a change in state of the pawl and ratchet mechanism associated therewith. The switch itself consists of a two-part switch body, that is, a base and an overlying cover along with two contacts having flexible contact arms, with the arms being self-biased in preferred positions and capable of opening in response to release of the second arm by shifting of the actuator pin from the left-hand or outboard slot position to the right-hand or inboard end of the same.

While the invention has been particularly shown and described with reference to a preferred embodiment thereof, it will be understood by those skilled in the art that various changes in form and details may be made therein without departing from the spirit and scope of the invention.

What is claimed is:

1. A retraction seat belt reel assembly of the type comprising a pair of spaced-apart frame plates, a reel rotatably mounted on a shaft extending between said frame plates, a seat belt wound on said reel, and a locking pawl movable between first and second positions, said pawl being disengaged from said reel when in said first position and being in locking engagement with said reel when in said second position to prevent withdrawal of belt material from said reel, a pin mounted on said locking pawl adjacent to one of said frame plates, a frame plate slot in said one frame plate, said pin extending through said frame plate slot and externally of said one frame plate, said pin being movable in said slot upon movement of said locking pawl between said first and second positions, a locking member mounted on said shaft at a location between said one frame plate and said reel, said locking member frictionally engaging said reel, said locking member having rotation limiting and control means to limit its rotation and constituting means to control the position of said pin and the movement of said pawl between said first and second positions, a switch in combination with said reel assembly comprising:

a switch housing mounted against said one frame plate and overlying said frame plate slot, first and second electrical terminals in said housing, said first terminal having a first contact arm, and said second terminal having a second contact arm, said second contact arm extending across said frame plate slot and being movable towards and away from said first contact arm to change the condition of said switch, said pin being engageable with said second contact arm to maintain said switch in one condition, the condition of said switch being changed when said locking pawl and said pin move between said first and second positions, whereby the condition of said switch is changed when said locking pawl is engaged with said reel thereby to control a safety circuit in an automobile in which said assembly is mounted.

2. The combination as set forth in claim 1 wherein said locking member comprises a locking arm, said rotation limiting and control means comprising a locking arm slot in said locking arm, said pin extending through said locking arm slot.

3. The combination as set forth in claim 2 wherein said pin maintains said switch in a closed condition with said second contact arm in engagement with said first contact arm when said locking pawl is in said first position.

4. The combination set forth in claim 3 wherein said housing comprises a base, a cover, and sidewalls extending between said base and cover, said base being against said one frame plate, a housing slot in said base, said housing slot conforming to, and being in alignment with, said frame plate slot, said pin extending through said housing slot.

5. The combination as set forth in claim 4 wherein said housing is generally triangular, said housing slot extending from a location adjacent to one apex of said housing towards the center thereof.

6. The combination set forth in claim 5 wherein said first terminal extends along one side of said housing and said first contact arm extends from said apex along another side of said housing, said one side and said other side extending from said apex.

7. The combination as set forth in claim 6 wherein one of said terminals is electrically connected to said one frame plate by metallic fastening means, said fastening means extending through said base of said housing and functioning to mechanically secure said housing to said one frame plate.

8. A retraction seat belt reel assembly of the type comprising a pair of spaced-apart frame plates, a reel rotatably mounted on a shaft extending between said frame plates, a seat belt wound on said reel, and a locking pawl movable between first and second positions, said pawl being disengaged from said reel when in said first position and being in locking engagement with said reel when in said second position to prevent withdrawal of belt material from said reel, a pin mounted on said locking pawl adjacent to one of said frame plates, a frame plate slot in said one frame plate, said pin extending through said frame plate slot and externally of said one frame plate, said pin being movable in said slot upon movement of said locking pawl between said first and second positions, a locking member mounted on said shaft at a location between said one frame plate and said reel, said locking member frictionally engaging said reel, said locking member having rotation limiting and control means to limit its rotation and constituting means to control the position of said pin and the movement of said pawl between said first and second positions, a switch in combination with said reel assembly comprising:

a switch housing mounted against the external surface of said one frame plate, said switch housing being generally triangular and comprising a base, a cover, and sidewalls extending between said base and cover, a housing slot in said base, said housing slot conforming to, and being in alignment with, said frame plate slot, said pin extending through said housing slot and into the interior of said housing, said housing slot having one of its end located adjacent to one apex of said housing and having its other end located centrally in said housing, said pin being proximate to said one end of said housing slot when said locking pawl is in said first position and being proximate to said other end of said housing slot when said locking pawl is in said second position, first and second electrical terminals in said housing, said second electrical terminal having a second contact arm which extends across said housing slot, said first electrical terminal extending along one side of said housing and having a first contact arm extending along another side of said housing, said one side and said other side extending from said apex, said second contact arm being normally spaced from said first contact arm and being flexibly moved by said pin towards, and into engagement with, said first contact arm when said locking pawl moves from said second position to said first position with concomitant movement of said pin from said other end of said housing slot to said one end of said housing slot whereby, said switch is closed when said locking pawl is in said first position, said second contact arm being resiliently movable away from said first contact arm when said locking pawl moves from said first position to said second position with concomitant movement of said pin from said one end of said housing slot to said other end of said housing slot whereby said switch is open when said locking pawl is in said second position, and metallic fastener means securing said housing to said one frame plate, said fastener means extending through portions of said second terminal thereby to electrically connect said second terminal to said other frame plate.

* * * * *